(12) United States Patent
Egly et al.

(10) Patent No.: US 10,252,666 B2
(45) Date of Patent: Apr. 9, 2019

(54) ILLUMINATED LASER ICON

(71) Applicant: Valeo North America, Inc., Troy, MI (US)

(72) Inventors: David Egly, Seymour, IN (US); John Orisich, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/395,266

(22) Filed: Dec. 30, 2016

(65) Prior Publication Data

US 2018/0186284 A1 Jul. 5, 2018

(51) Int. Cl.

| B60Q 3/14 | (2017.01) |
|---|---|
| B60Q 3/16 | (2017.01) |
| F21S 41/16 | (2018.01) |
| B60Q 3/18 | (2017.01) |
| B60Q 1/50 | (2006.01) |
| B60Q 11/00 | (2006.01) |
| B60Q 3/64 | (2017.01) |
| F21S 41/176 | (2018.01) |
| B60Q 3/62 | (2017.01) |

(52) U.S. Cl.
CPC .......... *B60Q 3/18* (2017.02); *B60Q 1/50* (2013.01); *B60Q 3/14* (2017.02); *B60Q 3/16* (2017.02); *B60Q 3/62* (2017.02); *B60Q 3/64* (2017.02); *B60Q 11/005* (2013.01); *F21S 41/16* (2018.01); *F21S 41/176* (2018.01)

(58) Field of Classification Search
CPC ... B60Q 3/14; B60Q 3/16; B60Q 3/18; B60Q 3/62; B60Q 3/64; B60Q 1/50; B60Q 1/503; F21S 41/14; F21S 41/16; F21S 41/176

See application file for complete search history.

(56) References Cited

U.S. PATENT DOCUMENTS

| 2009/0262760 | A1* | 10/2009 | Krupkin ............... G01S 7/414 372/6 |
|---|---|---|---|
| 2013/0027962 | A1* | 1/2013 | Takahashi ........... F21S 48/1145 362/538 |
| 2015/0375672 | A1* | 12/2015 | Takahashi ............ F21S 48/125 701/49 |
| 2017/0210282 | A1* | 7/2017 | Rodriguez Barros . B60Q 1/323 |

* cited by examiner

*Primary Examiner* — Thai Pham
(74) *Attorney, Agent, or Firm* — Oblon, McClelland, Maier & Neustadt, L.L.P.

(57) ABSTRACT

A vehicle lighting system includes a laser lighting device configured to provide a light source for a vehicle lighting device of the vehicle, and an indicator having a laser light icon. An indicator light source is configured to illuminate the laser light icon based on an operating state of the laser lighting device.

16 Claims, 7 Drawing Sheets

ILLUMINATED LASER ICON

BACKGROUND

Field of the Disclosure

The present disclosure is directed toward an illuminated laser icon and method for indicating a vehicle having a laser lighting device.

Description of the Related Art

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) and for the low beam in headlamp devices on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

Recently, laser based lighting products have been used to meet vehicle lighting and styling requirements. Manufacturers currently provide headlamps or rear lamps that are laser based. These products typically have some type of indicator or marketing logo to advertise to consumers that the latest in lighting technology is implemented in the product. The present inventors have recognized that these logos or icons are subtle and can go unnoticed, and do not convey information about an operational state of the laser.

SUMMARY

The present disclosure is directed to a lighting system, which can be a vehicle lighting system.

In a non-limiting illustrative example, the lighting system includes a laser lighting device configured to provide a light source, an indicator having a laser light icon, and an indicator light source configured to illuminate the laser light icon based on an operating state of the laser lighting device.

In another aspect of the lighting system, the laser lighting device is configured to provide a class four or higher laser light output.

In another aspect of the lighting system, the indicator is integrated with a component of the vehicle lighting device. In a further aspect of the lighting system, the indicator is integrated with a structural component of the vehicle lighting device.

In another aspect of the lighting system, the indicator is integrated with an optical component of the vehicle lighting device.

In another aspect of the lighting system, the indicator light source is the laser lighting device.

In another aspect of the lighting system, the indicator light source is separate from the laser lighting device. In a further aspect, the indicator light source comprises a fiber optic light panel assembly.

In another aspect, the lighting system further includes a controller configured to control the indicator light source to convey information about at least two different operating states of the laser lighting device.

In another aspect of the lighting system, the controller causes the indicator light source to be off while the laser lighting device is not in operation such that the indicator is not illuminated by the indicator light source, and to be on while the laser lighting device is in operation such that the indicator is illuminated by the indicator light source.

In another aspect of the lighting system, the indicator is visible when not illuminated.

In another aspect of the lighting system, the controller causes the indicator light source to be on in a first state while the laser lighting device is not in operation such that the indicator is illuminated, and to be on in a second state while the laser lighting device is in operation such that the indicator is illuminated. In a further aspect, the first and second states provide different light colors to the indicator. In a further aspect, the first and second states provide lighting of different spatial regions of the indicator.

In another aspect, the lighting system further includes a bezel, an outer lens, and a reflector. The indicator is structurally integrated with at least one of the bezel, the outer lens, and the reflector.

In another non-limiting illustrative example, a process for indicating a status of a lighting system is contemplated. The process includes the steps of detecting a status of a laser lighting device, and illuminating at least one laser light icon to indicate the status of the lighting system.

In another aspect, the step of detecting includes using a control system to detect an operating status of the lighting system.

In another aspect, the step of illuminating includes using a control system to illuminate at least one laser light icon.

In another aspect, the step of illuminating includes using a control system to illuminate a specific mode of at least one laser icon a specific color to indicate a status of the laser lighting device.

In another aspect, the process for indicating a status of the lighting system further includes the step of flashing at least one section of at least one laser light icon.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

In the drawings, like reference numerals designate identical or corresponding parts throughout the several views. Further, as used herein, the words "a", "an" and the like generally carry a meaning of "one or more", unless stated otherwise.

As noted above, current laser based lighting products have subtle marketing logos or icons that can go unnoticed by the consumer, and do not convey information about an operational state of the laser to the public. The present inventors recognized that, in headlamps or rear lamps that are laser based, it may be important to convey to the public that a laser is activated due to the potential for some lasers to cause eye injury. For example, laser classification standards, such as the IEC 60825-1, classify lasers based on their potential for harm, and specify different safety mechanisms and warning labels for different classes of lasers. The entire content of this standard is incorporated herein by reference. Embodiments of the present invention provide a backlit laser icon so that a person can visually see that that a laser is ON and can take caution.

Figure 1:
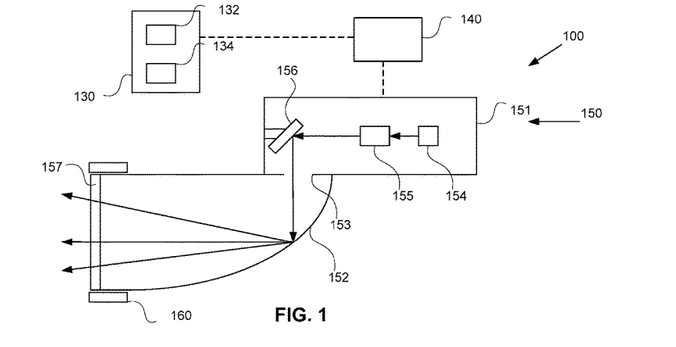
FIG. 1 is a diagram of a vehicle lighting system according to example embodiments of the invention.

FIG. 1 is a diagram of a vehicle lighting system according to example embodiments of the invention. As seen, the vehicle lighting system 100 includes an indicator system 130 coupled to a control system 140 which is coupled to a laser lighting device 150. The indicator system 130 includes an indicator light source 132 and an indicator 134. The indicator light source 132 may be a portion f laser light from the laser lighting device 150, or a separate light source as will be discussed below. Control system 140 controls lighting of the indicator system 130 based on an operational state of the laser lighting system 150. The controller may be an optical system that directs a portion of the light of the laser lighting system 150 to the indicator system 130 when the laser lighting system 150 is active, or a processor for controlling the indicator system 130 and/or the laser lighting system 150. For example, the control system may be a processor programmed to determine a state of laser lighting system 150, and to control a separate indicator light source 132 based on the determined state. The control system 140 may be implemented as any suitable processor or controller of a vehicle environment such as that discussed in FIG. 7 below.

The laser lighting device 150 includes a laser housing 151 connected to a reflector 152, an opening 153 located between the laser housing 151 and the reflector 152 allowing light to pass from inside the laser housing 151 to inside the reflector 152. One or more laser diodes 154, a prism 155, and a phosphorous lens 156 are positioned within the laser housing 151. Laser light emitted from the laser diodes 154 is directed through the prism 155 to produce concentrated light directed to the phosphorous lens 156. The phosphorous lens 156 diffuses and redirects light through the opening 153 toward the reflector 152, the reflector 152 reflecting the diffuse light through a headlight lens 157. The headlight lens 157 may be positioned within a bezel 160 to facilitate integration of the laser lighting system 150 as an exterior lighting device for a vehicle.

Figure 2:
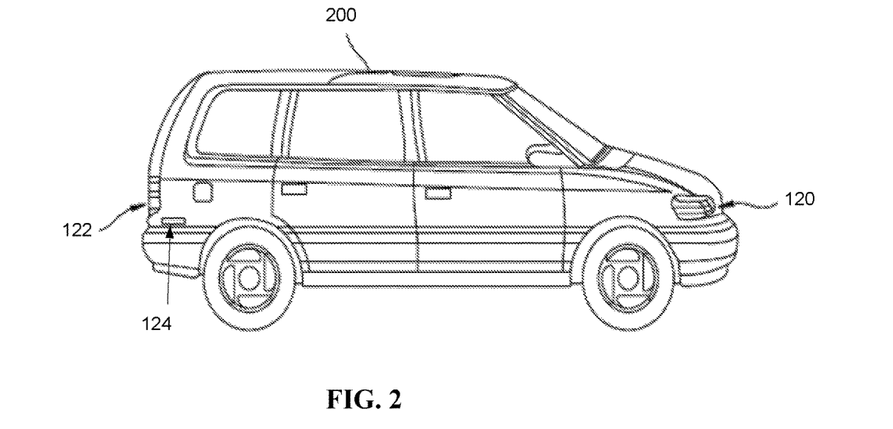
FIG. 2 is a schematic representation of a vehicle in which the vehicle lighting system may be implemented.

FIG. 2 is a schematic representation of a vehicle in which the vehicle lighting system 100 may be implemented. As seen in FIG. 2, the vehicle 200 includes a headlight assembly 120, a taillight assembly 122 and a side marker light assembly 124. It will be understood by one of ordinary skill in the art that the vehicle lighting system described herein may be used in connection with other vehicle lighting devices or assemblies.

Figure 3A:
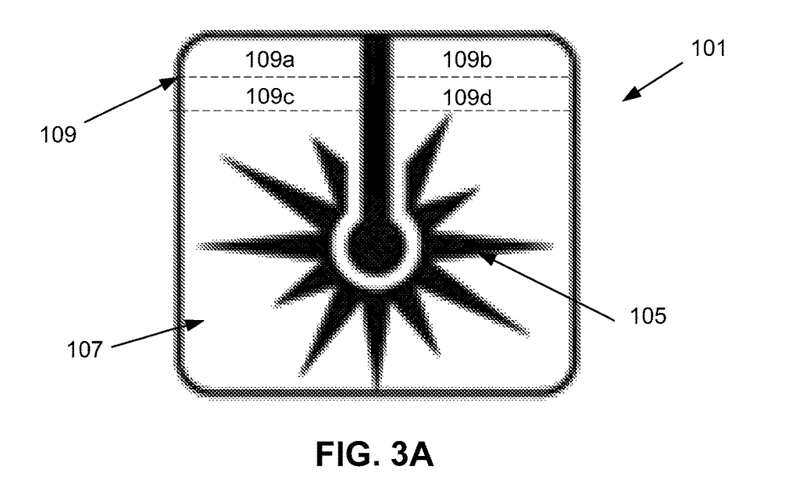
FIG. 3A-3D are diagrams of various operational modes of a laser light icon according to one example.

FIGS. 3A-3D are diagrams of an example indicator in various operational modes of the vehicle lighting system according to one example. As seen in FIG. 3A, the indicator 101 includes a lighted portion 105 and an unlighted or background portion 107. In the embodiment shown in FIG. 3A, the lighted portion 105 is preferably visible in an unlit state to convey (in a lit and unlit state) that laser technology is implemented in the lighting device to interested consumers for example. In addition, to lighted portion 105 may be illuminated when the laser lighting device 150 is active to caution the public that a laser is in use. As one example, the control system 140 may receive sensor data to indicate that the laser lighting system 150 is activated, and control a separate indicator light source 132 to provide backlighting to the lighted portion 105. As another example, the control system 140 may be a passive optical system that directs a portion of the laser light from the laser light device 150 to back light the indicator 101 when the laser lighting system is active.

The laser light icon 101 preferably appears on an exterior surface of a vehicle 200, but may appear on interior vehicle surfaces such as an instrument cluster or a physical, holographic, or virtual display screen visible to a driver and/or passengers. Exterior vehicle surfaces may include locations such as on an outer lens 157, a reflector 152, a bezel 160 positioned on or within a head lamp assembly 120, a tail lamp assembly 122, a side marker lamp assembly 124, or some other location. The laser light icon 101 may serve as an indicator for at least one of the head lamp assembly 120, the tail lamp assembly 122, and the side marker lamp assembly 124, and may or may not be located directly on or adjacent to said head lamp assembly 120, tail lamp assembly 122, and side marker lamp assembly 124. In some embodiments, the laser light icon 101 may be etched into an optical component such as the lens 157, or provided as a mask or screen for backlighting. Such mask may be implemented as a separate component of the lighting system, or integrated with a structural component such as the bezel 160. For example, the mask may be a metal film coating on a transparent bezel, with the metal film laser ablated to expose the lighted portion 105 for backlighting.

Figure 3B:
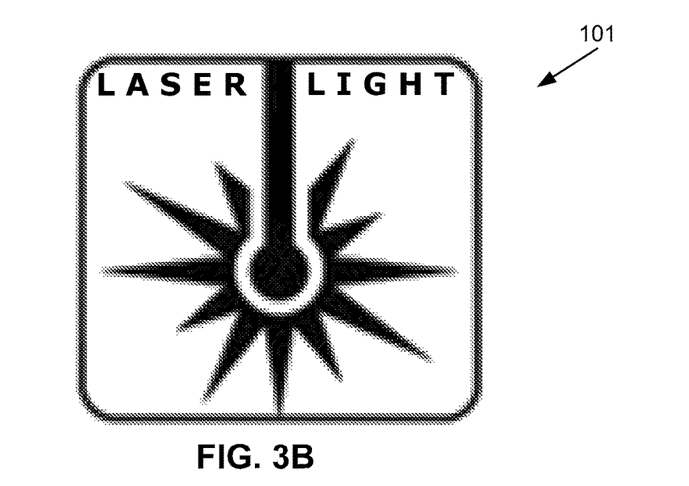
Figure 3C:
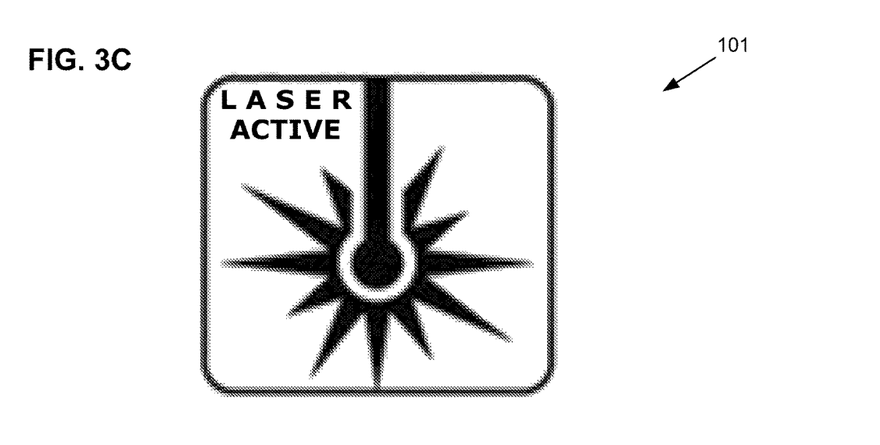
Figure 3D:
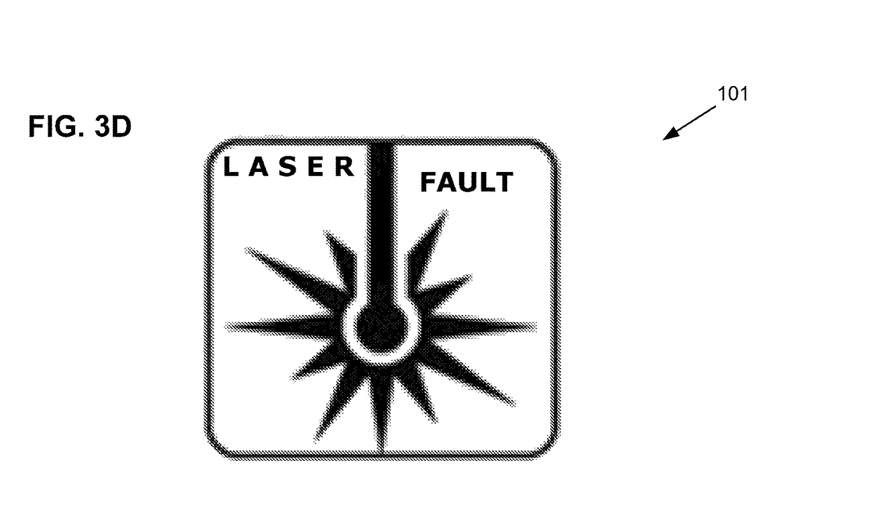

FIG. 3A also includes additional lighted portion 109 which may be divided into regions such as regions 109a, 109b, 109c and 109d. The additional lighted portion 109 provides the capability to convey more information about the operating state of the laser and/or convey information in different ways. For example, FIGS. 3A-3D show four modes of operation to indicate a status of the laser lighting system 150. FIG. 3A shows the laser light icon 101 in a non-illuminated mode. In addition to the logo function noted above, the unlit lighted portion 105 serves to indicate that the laser system 150 is not active. The lighted portion 105 is lit when the laser light system is active. Thus, the example of FIG. 3A indicates a simple on/off state of the laser device 150, without use of the additional lighted portion 109. Regions 109a-d are used to display alternate modes as shown in FIGS. 3B, 3C, 3D.

FIG. 3B shows the laser light icon 101 in an illuminated mode indicating the vehicle 200 is equipped with the laser lighting system 150, though the laser lighting system 150 may not be concurrently in use. FIG. 3C shows the laser light icon 101 in an illuminated mode indicating the laser lighting system 150 is currently in use. FIG. 3D shows the laser light icon 101 in an illuminated mode indicating the laser lighting system 150 is experiencing a fault or malfunction. The laser lighting system 150 may or may not currently be in use. In one case a user may determine if the malfunction signal allows the laser lighting system 150 to be in operation. In another case, whether the laser lighting system 150 may continue to be in operation despite the presence of the malfunction signal is determined at the time of manufacture or installation of the laser lighting system 150 or the control system 140. Further, malfunctions or faults may be distinguishable by the control system 140, the laser lighting system 150 then able to operate while experiencing certain malfunctions or faults but not while experiencing other malfunctions or faults.

All illuminated modes may share a common icon color, some modes may share a common icon color, or each mode may have a unique icon color when in operation. At least one mode may have a blinking or flashing illumination pattern, such as to indicate a malfunction of the laser lighting system 150. Icons may include both symbols and words.

In different modes, different symbols and words may be displayed or illuminated. In this example, the word "laser" is provided in region 109a and shown for all illumination modes, while the words "light", "active", and "fault" are provided in regions 109b, 109c and 109d, respectively, and are illuminated in different modes. Different words that are intended to be illuminated only in certain modes may not be located in the same general area so that they can be independently illuminated to indicate different modes. This may be provided by multiple indicator light sources, or by a light system with spatial illumination capability.

In one example, the laser light icon 101 displays one color for all three illuminated modes (FIG. 3B-3D) such as blue, green, or red.

In another example, the laser light icon 101 displays the same color for the illuminated modes of FIG. 3B and FIG. 3C, while the laser light icon 101 displays a different color for the illuminated mode of FIG. 3D. The modes of FIGS. 3B and 3C may be illuminated with blue, while the mode of FIG. 3D may be illuminated in red.

In another example, the laser light icon 101 displays a different color for each of the illuminated modes of FIG. 3B-3D such as green for that of FIG. 3B, blue for that of FIG. 3C, and red for that of FIG. 3D.

Any illumination mode may also include more than one color, such as a case where the word "Laser" is shown as a first color for all three illumination modes while other words may be illuminated in a second color.

Further, in any of the above examples, any illumination mode may include a blinking or flashing feature such as a case of the mode of FIG. 3D to indicate a fault or malfunction with the laser lighting system 150. The fault or malfunction indication may be displayed by at least one of a first laser light icon 101a and a second laser light icon 101b positioned on an exterior or an interior surface, respectively.

Figure 4A:
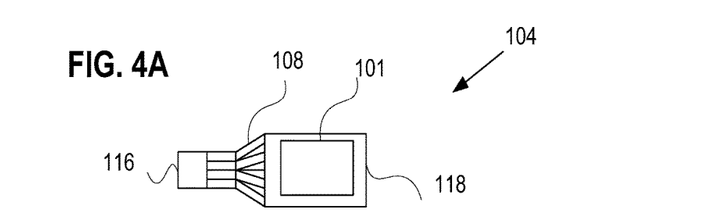
FIG. 4A is a schematic of a fiber optic light panel with one light source, according to one example.

Further, light for illuminating the laser light icon 101 may also originate from the laser lighting system 150 in combination with other light sources. In one embodiment, the laser light icon 101 may be illuminated by one or more fiber optic light panel assemblies. FIG. 4A is a schematic of a fiber optic light panel assembly 104, according to one example. The fiber optic light panel assembly 104 may comprise a light source 116 optically coupled to a fiber bundle 108, with the fibers of the fiber bundle 108 arranged to form a fiber optic light panel 118. The fibers may be abraded to emit light from a single outward facing side of the fiber optic light panel 118 to illuminate a laser light icon such as laser light icon 101. The light source 116 may have a fixed luminosity when operating or may be configured to allow luminosity to vary between at least two states of intensity.

For the laser light icon 101 or a section of the laser light icon 101 that may only be illuminated in one color, the fiber optic light panel assembly 104 may only need one light source 116. Further, the laser light icon 101 may be embedded, engraved, etched, molded, or otherwise formed as part of the fiber optic light panel 118 directly.

Figure 4B:
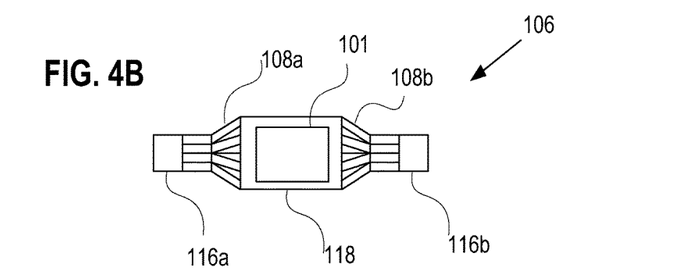
FIG. 4B is a schematic of a fiber optic light panel with two light sources, according to one example.

FIG. 4B is a schematic of a fiber optic light panel assembly 106, according to one example. The fiber optic light panel assembly 106 may comprise at least two light sources 116 (116a, 116b) optically coupled to a number of fiber bundles 108 (108a, 108b), the number of fiber bundles 108 to form a fiber optic light panel 118. The number of fiber bundles 108 may be abraded to emit light through to a second, outward facing side of the fiber optic light panel assembly 106 to illuminate a laser light icon 101. The fiber optic light panel assembly 106 may have multiple light sources 116a, 116b, and each light source 116a, 116b may have a fixed luminosity when operating or may be configured to allow luminosity to vary between at least two states of intensity. Further, the laser light icon 101 may be embedded, engraved, etched, molded, or otherwise formed as part of the fiber optic light panel 118 directly. A control system such as 140, or any processor or controller in the vehicle environment of FIG. 7 can be used to control the light sources 116a and 116b to provide spatial effects and/or dynamic light effects from the panel 118. Further, any region of the panel itself may be designed to provide a distinct light output from that region. Examples of fiber optic light panels with spatial and dynamic lighting are provided in the U.S. Patent Application title "Fiber Optic Light Panel with Plural Light Sources," filed by Application of the present application on common date herewith.

For the laser light icon 101 (or the laser light icon 102 or the laser light icon 103 discussed below) or a section of the laser light icon 101 that may be illuminated in more than one color, depending on the mode, the fiber optic light panel assembly 106 may only need one light source 116, or may have more than one light source 116 and each light source 116 may be controlled individually such that the fiber optic light panel assembly 106 may be illuminated by one or more light source 116 simultaneously.

For the laser light icon 101 (or the laser light icon 102 or the laser light icon 103) or a section of the laser light icon 101 that may be illuminated in two or more colors, the fiber optic light panel assembly 106 may have at least two light sources 116 such as a first and a second light source 116a, 116b of different colors. The first light source 116a may be illuminated to provide a first color while the second light source 116b is not illuminated. The second light source 116b may be illuminated to provide a second color while the first light source 116a is not illuminated. Illuminating the first and second light sources 116a, 116b simultaneously may produce a third color.

Figure 4C:
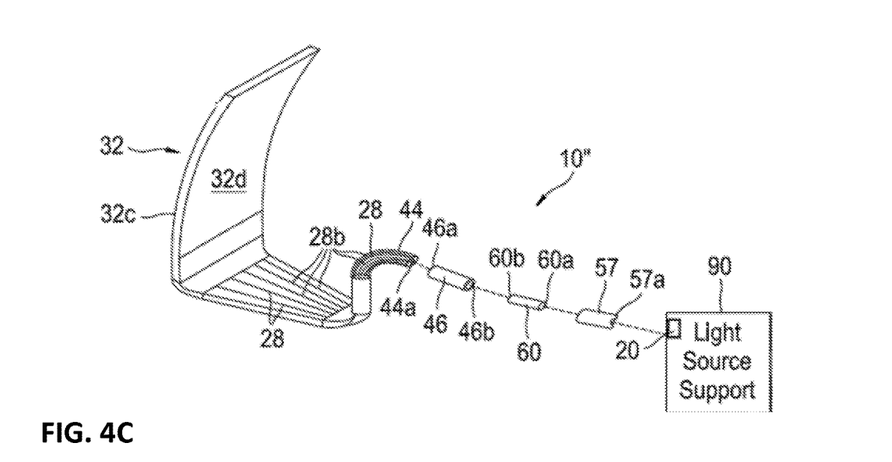
FIG. 4C is a view of a fiber optic light panel device according to embodiments of the invention.
Figure 5A:
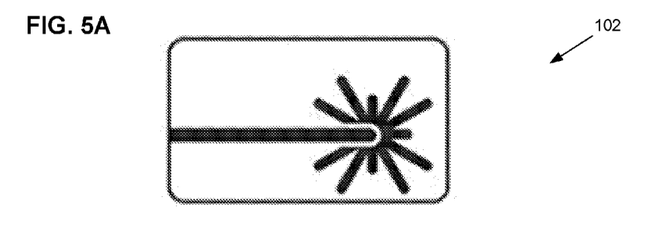
FIG. 5A-5D are diagrams of various operational modes of a laser light icon, according to one example.
Figure 5B:
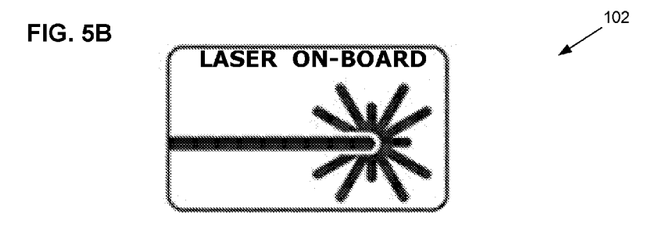
Figure 5C:
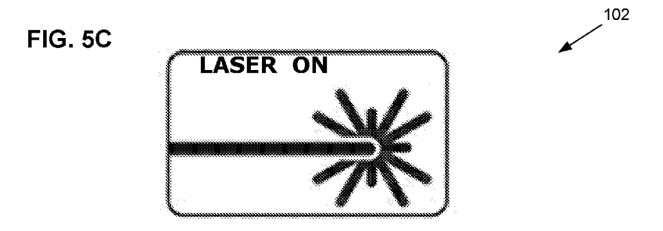
Figure 5D:
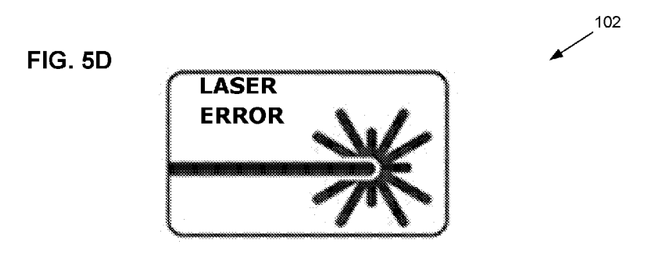
Figure 6A:
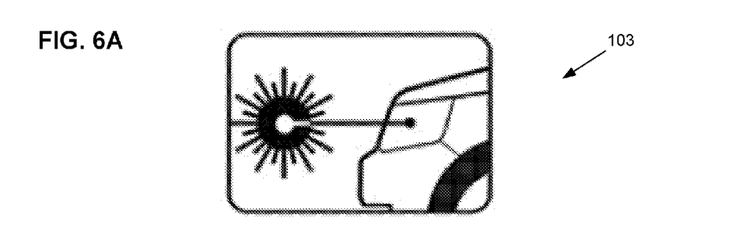
FIG. 6A-6D are diagrams of various operational modes of a laser light icon, according to one example.
Figure 6B:
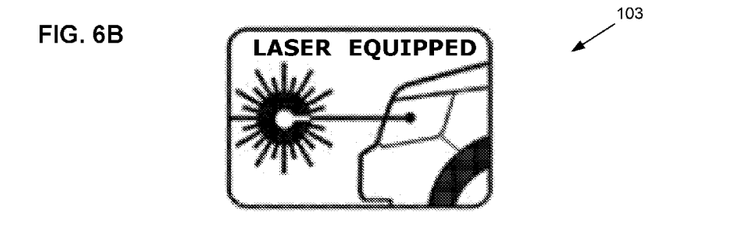
Figure 6C:
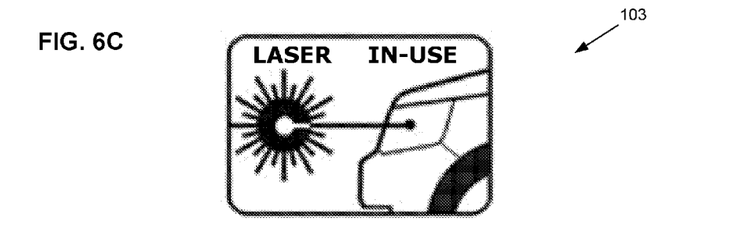
Figure 6D:
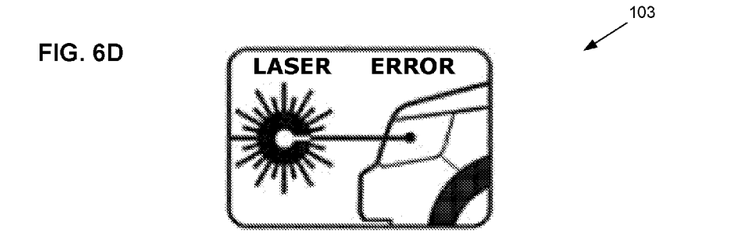

FIG. 4C is an exploded view showing arrangement of the components of a fiber optic light panel that may be used to backlight an indicator in accordance with an embodiment of the invention. For example, the device 10" may be included in the headlight 120 or taillight 122 of a vehicle 200 as shown in FIG. 2. As seen in FIG. 4C, the system 10" includes a panel 32 having a light emitting side 32e through which light from a plurality of optical fibers 28 is emitted to backlight an indicator such as indicator 101. Fibers 28 are arranged in a fiber array, and may be embedded in a substrate which could be a polymer, resin or other conventional substrate. Portions 28*b* of the plurality of optical fibers 28 extend out of the panel 32 and are gathered and combined in a fiber bundle 44 to define a light-receiving end or input end 44*a*. In the embodiment of FIG. 4C, the input end 44*a* becomes operatively positioned in a first end 46*a* of a mechanical coupler 46 having opposing end 46*b*. The coupler 46 may be a ferrule and include a wrap, sleeve, adhesive, tape, resin or the like to facilitate holding the fibers 28 in the bundled position.

Optical coupler 60 has first and second ends 60*a* and 60*b*. The first end 60*a* is mechanically coupled to, and received in, a hollow plug 57. Second end 60*b* is received in the second end 46*b* of coupler 46 to optically align coupler/60 to the fiber bundle 44. During assembly, an end 57*a* of the plug 57 is coupled to the light source support of a vehicle light housing to provide optical coupling with the light source 20. In the illustration, the optical coupler 60 is an integral one piece construction made of silicone or plastic. The optical coupler 60 may be an optical mixer configured to improve a homogeneous property of light coupled to the fiber bundle as disclosed in U.S. patent application Ser. No. 15/210,189, filed by the present Applicants on Jul. 14, 2016. The entire content of this application is incorporated herein by reference.

A method for indicating a status of a laser lighting system 150 may include the steps of detecting a status of the laser lighting system 150, and illuminating a laser light icon 101 to indicate the status of the laser lighting system 150. An additional detection step may include detecting a specific type of status. Detection may be provided by a simple photo sensor and/or by data output from any vehicle device in the vehicle environment of FIG. 7. Additional illumination steps may include illuminating at least one laser light icon 101, illuminating a specific icon message on at least one laser light icon 101, or illuminating at least one laser light icon 101 a specific icon color. Other additional steps may include flashing at least one section of at least one laser light icon 101, allowing the use of the laser lighting system 150 when a fault has been detected, or preventing the use of the laser lighting system 150 when a fault has been detected. Further, illumination may be controlled by software, or firmware or any other logic control stored in memory in the vehicle environment.

FIG. 5A-5D are diagrams of various operational modes of a laser light icon, according to one example. The modes of the laser light icon 102 shown in FIG. 5A-5D correspond to the modes of the laser light icon 101 shown in FIG. 3A-3D, respectively. In one example, words and symbols displayed in the mode of FIG. 5C may be a portion of the words displayed in the mode of FIG. 5B and use the same fiber optic light panel assembly 104 or portion of fiber optic light panel assembly 104. Certain symbols and words may be displayed for different illumination modes. In this example, the word "laser" is shown for all illumination modes, while the words "on-board", "on", and "error" are illuminated in different modes. Different words and symbols that are intended to be illuminated only in different modes may be located in nearby or adjacent areas of the laser light icon 102, such as the locations shown of the words cited above. This may be accomplished using a fiber optic light panel assembly 104 or a combination of at least two fiber optic light panel assembly 104 that have multiple fiber bundle 108 located in adjacent or proximal areas behind at least a portion of the fiber optic light panel assembly 104. A number of fiber bundle 108 may each be individually connected to at least one light source 116.

FIG. 6A-6D are diagrams of various operational modes of a laser light icon, according to one example. The modes of the laser light icon 103 shown in FIG. 6A-6D correspond to the modes of the laser light icon 101 of FIG. 3A-3D, respectively. In one example, words and symbols displayed in the modes of FIG. 6C-6D may be a portion of the words and symbols displayed in the mode of FIG. 6B and use the same fiber optic light panel assembly 104 or portion of fiber optic light panel assembly 104.

Certain symbols and words may be displayed for different illumination modes. In this example, the word "laser" is shown for all illumination modes, while the words "equipped", "in-use", and "error" are illuminated in different modes. Different words and symbols that are intended to be illuminated only in different modes may be located in a same general area of the laser light icon 103, such as the location shown for the words cited above. This may be accomplished using a fiber optic light panel assembly 104 or a combination of at least two fiber optic light panel assemblies 104 that have interwoven fiber bundle 108 located in the same are or section behind at least a portion of the fiber optic light panel assembly 104. A number of fiber bundles 108 may each be individually connected to at least one light source 116.

Advantageously the embodiments described herein are particularly suited for exterior lighting and in environments where it is necessary that the lighting match or conform to the contour or styling of the vehicle V.

Figure 7:
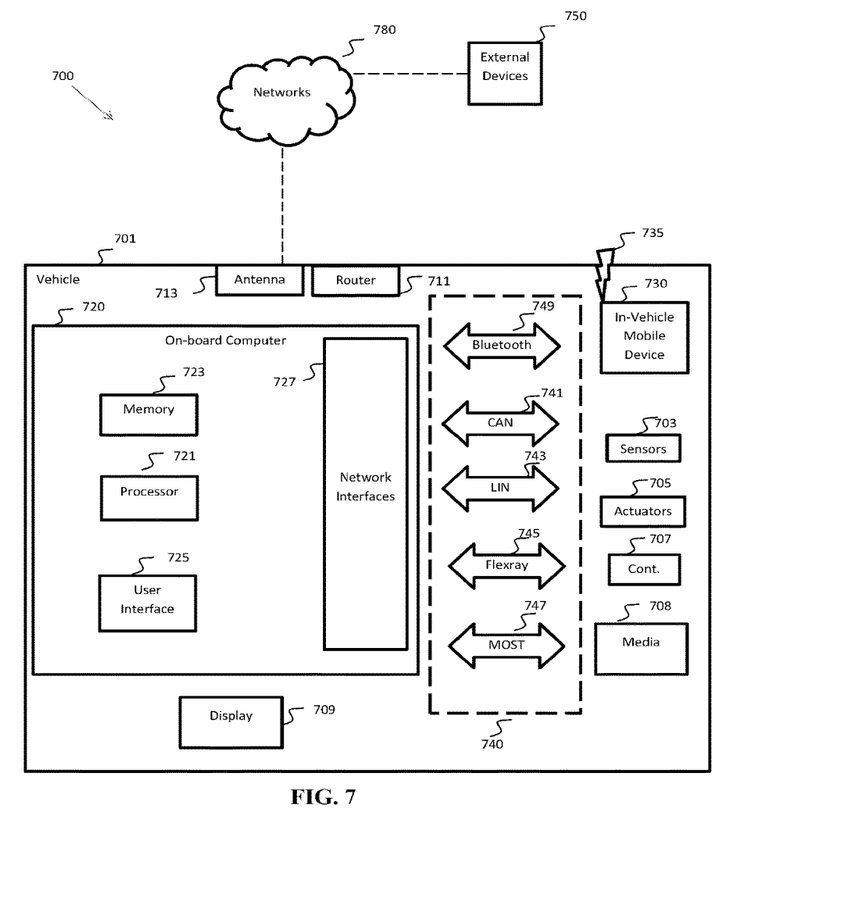
FIG. 7 is a simplified block diagram of a vehicle environment in which embodiments of the invention disclosed herein may be implemented.

FIG. 7 is a simplified block diagram of a vehicle environment in which embodiments of the invention disclosed herein may be implemented. The vehicle environment 700 includes a vehicle 701 in communication with one or more external devices 750 by way of one or more external networks 780. Vehicle 701 also includes various internal networks 740 for interconnecting several vehicle devices within the vehicle as will be discussed below. The vehicle environment 700 may also include one or more in-vehicle mobile device 730. External devices 750 include any device located outside the vehicle 701 such that the external device must communicate with the vehicle and its devices by an external network 780. For example, the external devices may include mobile devices, electronic devices in networked systems (e.g., servers or clients in a local area network (LAN), etc.), on board computers of other vehicles etc. In-vehicle mobile devices 730 are devices which are located within, or in the vicinity of the vehicle 701 such that the in-vehicle mobile device can communicate directly with internal networks 740 of the vehicle 701. In-vehicle mobile devices 730 may also connect with external networks 780 as discussed below.

Vehicle 701 includes vehicle devices integral with or otherwise associated with the vehicle 701. In the embodiment of FIG. 7, vehicle devices include one or more sensors 703, one or more actuators 705, one or more control units 707, one or more media systems 708, one or more displays 709, one or more routers 711, one or more antenna 713, and one or more on board computers 720. As used herein, the term "vehicle device" is meant to encompass sensors, actuators, controllers, electronic control units (ECUs), detectors, instruments, embedded devices, media devices including speakers, a CD and/or DVD player, a radio, etc, vehicle navigation systems (e.g., GPS) displays, other peripheral or auxiliary devices or components associated with the vehicle 701.

Sensors 703 detect various conditions within (or in the immediate vicinity of) the vehicle 701. For example, sensors 703 may be temperature sensors, photosensors, position sensors, speed sensors, angle sensors or any other sensor for detecting a diagnostic condition or other parameter of the vehicle 701 or its ambient environment. Sensors 703 may be passive or "dumb" sensors that provide an analog representative of the sensed parameter, or so called "smart" sensors with integrated memory and digital processing capability to analyze the parameter sensed within the sensor itself. Actuators 705 cause motion of some mechanical element of the vehicle in response to a control signal. For example, actuators 705 may be hydraulic actuators, pneumatic actuators or electrical/electronic actuators such as a stepper motor. Actuators 705 may be used to move vehicle lighting devices to implement intelligent light, for example.

Actuators 705 may also be "dumb" devices that react to a simple analog voltage input, or "smart" devices with built-in memory and processing capability. Actuators 705 may be activated based on a sensed parameter from sensors 703, and one such sensed parameter may be a physical position of the actuator 703 itself. Thus, the sensors 703 and actuators 705 may be connected in a feedback control loop for diagnostic detection and control of the vehicle 701.

Control units 707 include any embedded system, processor, electronic control unit (ECU) or microcontroller. Control unit 707 may be dedicated to a specific region or function of the vehicle 701. For example, control unit 707 can provide memory and control logic functions for several dumb devices, such as passive sensors 703 and actuators 705. In one embodiment, control unit 707 is an ECU dedicated for controlling one or more lighting devices according to embodiments disclosed herein. Typically, numerous ECUs, with different embedded software, may be found in a single automobile and may communicate via internal networks as discussed below.

On-board computer 720 is a vehicle device for providing general purpose computing functionality within the vehicle 701. The on-board computer 720 typically handles computationally intensive functions based on software applications or "apps" loaded into memory. On-board computer 720 may also provide a common interface for different communication networks in the vehicle environment 700. On-board computer 720 includes one or more processor 721, one or more memory 723, one or more user interface 725, and one or more network interface 727. One or more display 709 and one or more router 711 may be an integral part of the on board computer 710, or distributed in the vehicle and associated with the on-board computer and other vehicle devices. Separate displays 709 may be provided in suitable locations for access by a driver and passengers in the vehicle 701.

On-board computer 720, and other associated or integrated components such as vehicle devices can include one or more memory element 76 for storing information to be used in achieving operations associated with control of fiber optic light panels as disclosed herein. Further, these devices may keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in vehicle environment 700 could be provided in any database, register, table, cache, queue, control list, or storage structure, based on particular needs and implementations, all of which could be referenced in any suitable timeframe.

In example embodiments, the operations for controlling fiber optic light devices may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar vehicle device, etc.). In some of these instances, one or more memory elements (e.g., memory 723) can store data used for the operations described herein. This includes the memory elements being able to store software, logic, code, or processor instructions that are executed to carry out the activities described in this Specification.

Processor 721 can execute software or algorithms to perform activities to enable control of lighting devices disclosed herein. A processor 721 can execute any type of instructions associated with the data to achieve the operations detailed herein. In one example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of computer-readable mediums suitable for storing electronic instructions. Any of the potential processing elements, modules, microprocessors, digital signal processors (DSPs), and other devices described herein should be construed as being encompassed within the broad term 'processor.'

Elements of FIG. 7 may be communicatively coupled to one another by one or more suitable communications medium (wired, wireless, optical) that provides a pathway for electronic communications. Any element in FIG. 7 may act as a network node in communication with any other element of FIG. 7 also acting as a network node. Any suitable network messaging protocol, network topology or network geographic scope may be included in the vehicle environment 700. Thus, embodiments of on-board computer 10 may include one or more distinct interfaces, represented by network interfaces 727, to facilitate communication via the various networks (including both internal and external networks) described herein. Such network interfaces 727 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS, etc.). Other interfaces represented by network interfaces 26, may include physical ports (e.g., Ethernet, USB, HDMI, etc.), interfaces for wired and wireless internal subsystems, and the like. Similarly, each of the nodes of vehicle environment 700 can also include suitable interfaces for receiving, transmitting, and/or otherwise communicating data or information in the vehicle environment 700.

Multiple internal vehicle networks represented by 740 may exist in the vehicle 701 to provide communication pathways to various vehicle devices distributed throughout the vehicle 701. An internal vehicle network 740 is a collection of nodes, such as vehicle devices, integrated with or otherwise linked to the vehicle and interconnected by communication means. Vehicle networks 740 typically include hard wired bus type networks, each providing communication pathways to particular vehicle devices distributed throughout a vehicle. FIG. 7 shows four examples of such hard wired networks: Controller Area Network (CAN)

741, Local Internet Network (LIN) 743, Flexray bus 745, and Media Oriented System Transport (MOST) network 747.

CAN bus 741 uses a message based protocol, designed for and typically used by automotive applications. The CAN bus 741 is a vehicle bus standard designed to allow microcontrollers, sensors, and other devices to communicate with each other via the CAN without a host computer. CAN protocol may be used for soft real-time control of devices such as a vehicle antilock braking system. For example, CAN bus 741 may connect a transmission sensor and an energy sensor to a main engine controller, and a different CAN bus may connect the main engine controller and a main body controller to on-board computer 720. LIN network 743, may be used to sense external conditions such as light, or to control small mechanisms such as door locking systems. For example, LIN bus 743 may connect a driver's seat actuator, temperature controls, and windshield wiper actuators to a main body controller of a CAN bus.

Flexray bus 745 is typically a dedicated network for hard real-time controllers, used for drive-by-wire and/or brake-by-wire applications in which information from the engine and/or wheels of the vehicle 701 is collected and transmitted to appropriate applications and/or data repositories. For example, Flexray bus 745 may connect a chassis module of the vehicle 701 to on-board computer 720 through an appropriate interface, and/or may connect brakes and electronic stability control (ESB) to the chassis module attached to Flexray 745. MOST network 747 can also be found in vehicles for transmitting audio, video, and voice on fiber optics. MOST buses 747 can connect media system 708, to on-board computer 720 through appropriate interfaces, and/or connect a reversing camera and a navigation system to an intermediate device which is connected to computer by MOST bus 747.

Other hard wired internal networks such as Ethernet may be used to interconnect vehicle devices in the vehicle. Further, internal wireless networks 749, such as near field communications, Bluetooth etc may interconnect vehicle devices.

External networks 78 may be accessed from vehicle 701 by vehicle devices and in-vehicle mobile devices 730 when a communication link is available. In-vehicle mobile devices 730 include mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within vehicle environment 700. Data, may be any type of numeric, voice, video, or script data, or any type of source or object code, or any other suitable information in any appropriate format that may be communicated from one point to another in electronic devices and/or networks. A vehicle router 711 may also be used to access external network infrastructure within range of the antenna 713 of vehicle 701.

Some form of wireless communication is needed to achieve external network connectivity from vehicle 701. For example third generation (3G), fourth generation (4G), and 3GPP long term evolution (LTE) wireless telephone technologies, worldwide interoperability for microwave access (WiMax), WiFi, and dedicated short-range communications (DSRC) are some of the numerous wireless technologies currently available with the appropriate interfaces and network infrastructure to support the technology.

Users (driver or passenger) may initiate communication in vehicle environment 700 via some network, and such communication may be initiated through any suitable device such as, in-vehicle mobile device 730, display 709, user interface 725, or external devices 750.

In-vehicle mobile devices 730, and mobile devices external to vehicle 701, may communicate with on-board computer 720 through any wireless or wired communication link and may be configured as a personal area network (PAN) or a wireless personal area network (WPAN) or any other appropriate networking architecture or system that facilitates communications in a network environment. Wired and wireless communication links may any electronic link such as Bluetooth, wireless technologies (e.g., IEEE 802.11x), a USB cable, an HDMI cable, etc. In one example, an external mobile device may be connected to computer 72 through a USB cable or wireless network when, for example, the external mobile device is a diagnostic tool used by a mechanic for servicing vehicle 10.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

Thus, the foregoing discussion discloses and describes merely exemplary embodiments of the present application. As will be understood by those skilled in the art, the present application may be embodied in other specific forms without departing from the spirit or essential characteristics thereof. Accordingly, the disclosure of the present application is intended to be illustrative, but not limiting of the scope of the application, as well as other claims. The disclosure, including any readily discernable variants of the teachings herein, define, in part, the scope of the foregoing claim terminology such that no inventive subject matter is dedicated to the public.

What is claimed is:

1. A lighting system, comprising:
   a laser lighting device having a laser configured to provide a light for a vehicle;
   an indicator having a laser light icon;
   an indicator light source configured to illuminate the laser light icon according to an operating state of the laser lighting device, wherein the operating state is at least one of on, off, equipped with the laser, in use, and experiencing a fault;
   a sensor provided in the vehicle to sense a parameter related to the operating state of the laser lighting device; and
   a controller that receives sensor data from the sensor and determines the operating state of the laser lighting device based on the sensor data, wherein the controller is connected to the indicator light source, to provide a signal to the indicator light source to control the indicator light source to convey information about at least two of the operating states of the laser lighting device.

2. The lighting system of claim 1, wherein the indicator is integrated with a component of the vehicle lighting device.

3. The lighting system of claim 2, wherein the indicator is integrated with a structural component of the vehicle lighting device.

4. The lighting system of claim 1, wherein the indicator is integrated with an optical component of the vehicle lighting device.

5. The lighting system according to claim 1, wherein the indicator light source is the laser lighting device.

6. The lighting system according to claim 1, wherein the indicator light source is separate from the laser lighting device.

7. The lighting system of claim 6, wherein the indicator light source comprises a fiber optic light panel assembly.

8. The lighting system according to claim 1, wherein the controller causes the indicator light source to be off while the laser lighting device is off such that the indicator is not illuminated by the indicator light source, and to be on while the laser lighting device is on such that the indicator is illuminated by the indicator light source.

9. The lighting system according to claim 1, wherein the indicator is visible when not illuminated.

10. The lighting system according to claim 1, wherein the controller causes the indicator light source to be on in a first state while the laser lighting device is off such that the indicator is illuminated, and to be on in a second state while the laser lighting device is on such that the indicator is illuminated.

11. The lighting system according to claim 10, wherein the first and second states provide different light colors to the indicator.

12. The lighting system according to claim 10, wherein the first and second states provide lighting of different spatial regions of the indicator.

13. The lighting system according to claim 1, further comprising:
a bezel;
an outer lens; and
a reflector, wherein the indicator is structurally integrated with at least one of the bezel, the outer lens, and the reflector.

14. A method for indicating a status of a lighting system comprising a laser lighting device having a laser configured to provide a light for a vehicle; an indicator having a laser light icon; an indicator light source configured to illuminate the laser light icon according to an operating state of the laser lighting device; a sensor provided in the vehicle to sense a parameter related to the operating state of the laser lighting device; and a controller that receives sensor data from the sensor and determines the operating state of the laser lighting device based on the sensor data, wherein the controller is connected to the indicator light source, to provide a signal to the indicator light source to control the indicator light source to convey information about at least two of the operating states of the laser lighting device, the method comprising:
detecting an operating state of the laser lighting device, and
illuminating the laser light icon to indicate the operating state of the lighting system via the indicator light source, wherein
the operating state is at least one of on, off, equipped with the laser, in use, and experiencing a fault.

15. The method of claim 14, further comprising illuminating the laser light icon with a specific color to indicate the operating state of the laser lighting device.

16. The method of claim 14, further comprising the step of flashing at least one section of the laser light icon.

* * * * *